April 24, 1951 W. B. RETZ 2,550,645
TOOLHOLDER
Filed Dec. 12, 1946

INVENTOR
William B. Retz
BY
Mitchell Bechert
ATTORNEYS

Patented Apr. 24, 1951

2,550,645

UNITED STATES PATENT OFFICE 2,550,645

TOOLHOLDER

William B. Retz, Plainville, Conn., assignor to The New Britain Machine Company, New Britain, Conn., a corporation of Connecticut Application December 12, 1946, Serial No. 715,817

12 Claims. (Cl. 29—106)

1

My invention relates to tool holders and the like, and in particular to improved means cooperating with a tool holder for directing coolant or lubricant on the work and the tool in the vicinity of cutting action.

It is an object of the invention to provide an improved tool holder for lathes and other spindle machines.

It is another object to provide improved means for directing coolant or lubricant on the tool and on the work in a machine of the character indicated.

It is a more specific object to provide an improved cooling and lubricating means wherein coolant may be efficiently directed over the working area without introducing special plumbing into the vicinity of the work or of the tool.

Another specific object is to provide improved means for continuously directing coolant at an advancing cutting edge.

Other objects and various further features of the invention will be pointed out or will occur to those skilled in the art from a reading of the following specification in conjunction with the accompanying drawings. In said drawings.

Broadly speaking, my invention contemplates provision of a fluid-communicating duct in a tool holder and having this duct communicate with suitable nozzle means in the tool-supporting end of the holder. The nozzle means may be built into and carried by the tool holder so as constantly to direct streams of coolant or lubricant at precisely the working edges or surfaces of the tool and of the work. In the specific forms to be described, a fan-shaped spray may be directed from a relatively simple and compact nozzle built into the tool-supporting end of the holder, and this spray may be adjusted to impinge upon the entire cutting edge of even a relatively wide cutting edge. Novel means are also provided for the readily removable insertion of fluid couplings at the inlet end of the duct.

Figure 1:
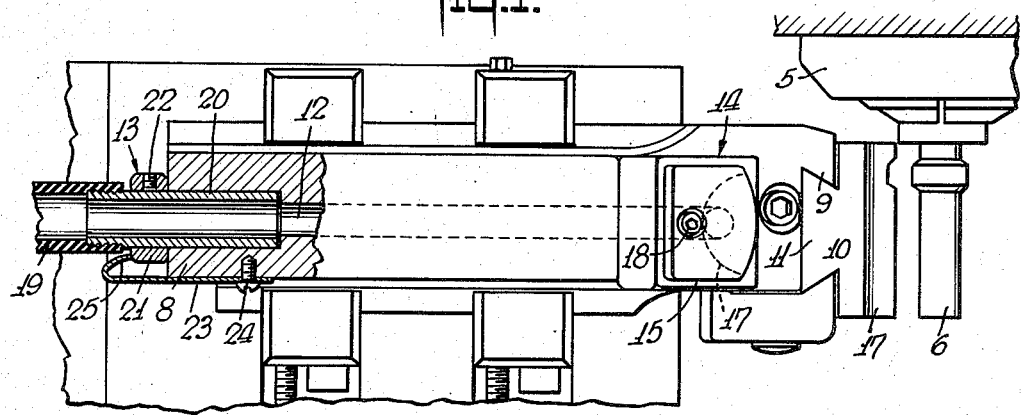
Fig. 1 is a partially sectionalized plan view of a tool holder incorporating features of the invention—the holder is shown cooperating with work held in the spindle of a lathe or similar machine.
Figure 2:
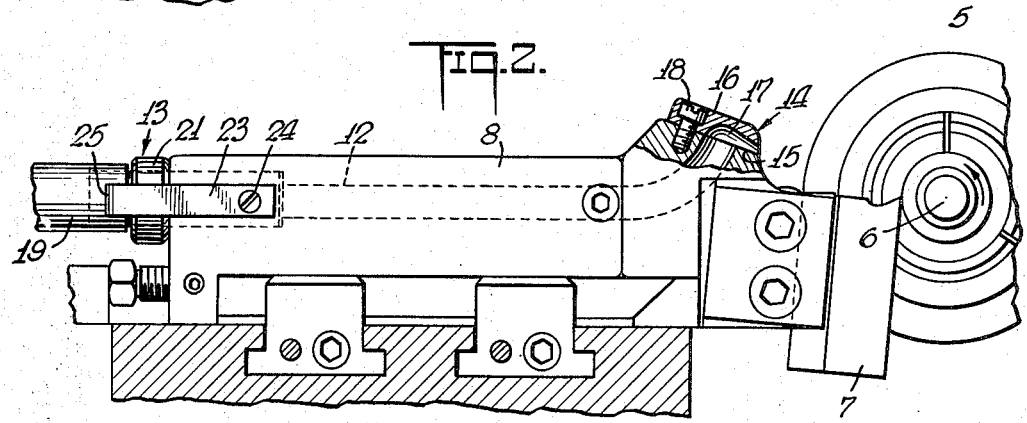
Fig. 2 is a partially sectionalized side view of the tool holder and spindle of Fig. 1.

Referring to Figs. 1 and 2 of the drawing, my invention is shown in application to a so-called side-tool holder for a lathe-type machine having a spindle 5 rotatably supporting a piece of work

2

6, which may be of bar stock. The side-tool holder supports a relatively wide tool 7 for lateral motion with respect to the stock 6. In the form shown, the tool holder includes a main body member 8 with suitable tool-supporting means at one end. The tool-supporting means may comprise fixed and adjustable jaw members 9—10 for adjustably securing a dovetail 11 formed in the tool 7.

In accordance with the invention, the body member 8 is provided with an internal fluid-communicating duct 12 having suitable means 13 for connection to a source of fluid supply. The other end of the duct terminates in nozzle means 14 for directing sprayed coolant or lubricant in the vicinity of the cutting action. In the form shown, the nozzle means 14 provides a relatively flat fan-shaped sheet of sprayed fluid, the sheet being so formed as to include substantially the entire cutting edge of the tool. Since the cutting edge of the tool 7 is shown to be essentially straight, the fan-shaped spray produced by the nozzle 14 is preferably designed to be substantially flat.

To produce a flat spray the nozzle means 14 may comprise a flat portion 15 so formed on the body member 8 in the vicinity of the outlet for the duct 12 that a projection of the plane of the flat 15 will substantially intercept the cutting edge of the tool 7. Overstanding the flat 15 is a cap member 16 having a generally hollowed portion 17 communicating with the outlet end of the duct 12 and open also along an extended edge, whereby the cap 16 and the flat 15 may cooperate to define a slit-like opening for producing a fan-shaped spray. The cap 16 may be secured to the body member 8 by a screw 18 set generally normal to the plane of the flat 15; the screw 18 preferably passes through the cap 16 on the side of the duct outlet away from the nozzle opening. It will be appreciated that with the arrangement described for securing the nozzle means 14, the cap member may be angularly positioned about the axis of the screw 18 and that, in this manner, the general direction of the fan spray may be adjusted as desired.

The supply pipe 19 is preferably quickly removable from the inlet end of the duct 12. In the form shown, ready removability is accomplished by provision of an adapter 13 carried by the pipe 19, and resilient means cooperate between the adapter 13 and the body member 8 to hold the two parts in interfitting relation. The adapter 13 may include a generally tubular portion 20 slidingly fitting within a counterbore in the inlet end of the duct 12, and a circumferentially extending enlarged portion 21 may be secured as by a set screw 22 to the tubular part 20. The resilient means for holding the adapter means 13 to the body member 8 may comprise a strip 23 of springy or resilient material secured as by screw means 24 to the body 8 and including a projecting latch portion 25 for engagement with the far side of the enlarged portion 21 of the adapter 13. It will be appreciated that as the adapter 13 is inserted in the counterbore at the inlet to the duct 12, the enlarged portion 21 will engage the latch 25 to displace the same until it may resiliently lock against the far or back side of the enlarged adapter portion 21. To remove the pipe 19 and its adapter 13, a simple manual operation will serve to displace the latch 25 outwardly.

Figures 3, 4:
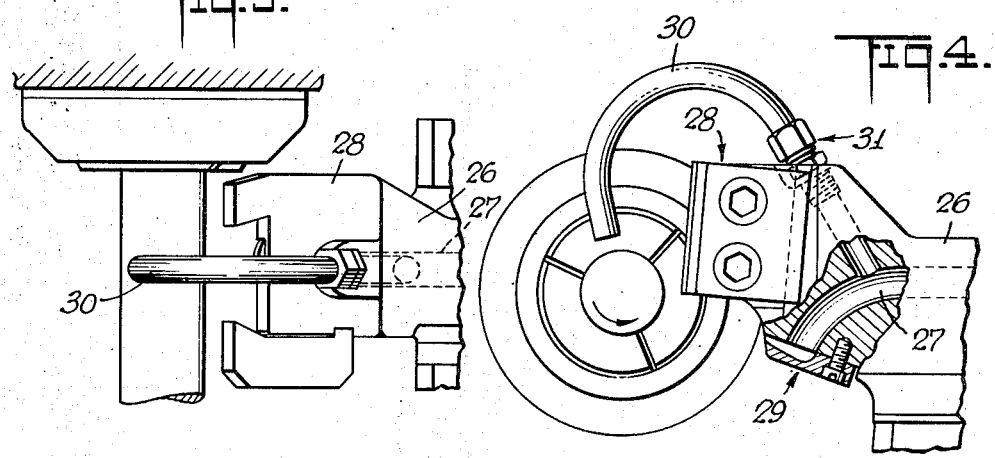
Fig. 3 is a fragmentary plan view illustrating a modification of the tool holder of Fig. 1.
Fig. 4 is a side view of the arrangement of Fig. 3.

Referring now to the arrangement of Figs. 3 and 4, I show how a plurality of nozzles may be provided on a tool holder so as to direct a plurality of streams at the cutting area from different directions. In the form shown, the tool holder is again a side-working tool holder, and the tool has been omitted from the drawing for purposes of clarity. As in the case of Figs. 1 and 2 the tool holder of Figs. 3 and 4 comprises a body portion 26 having a fluid-communicating duct 27 therein, and work and tool-supporting means 28 at one end. On one side of the tool-supporting means a fan-shaped nozzle means 29 (as described in Figs. 1 and 2) may be provided to direct a sheet of coolant at the cutting edge from underneath the tool-supporting means 28. On the other side a nozzle formed from a small length of pipe 30 may be adapted to the body member 26 by suitable couplings 31; this nozzle pipe 30 may be bent so as also to direct coolant or lubricant on the work in the vicinity of the cutting action, but from the upper side of the tool-supporting means 28. Both nozzle means 29 and 30 may communicate with the same supply duct 27 in the body member 26, and inlet fluid may be supplied by a readily removable adapter such as that shown in Figs. 1 and 2.

It will be appreciated that I have described relatively simple means for conducting coolant or lubricant to the vicinity of cutting action in a turning machine and for providing effective distribution of such coolant with a simplification of plumbing. With the invention no loose or flexible pipe members need be anywhere near the cutting area, and a maximum of free access to the tool and to the work is permitted for adjustment purposes. It is considered particularly advantageous that the coolant nozzles be carried by the tool holder and that the coolant streams may thus always be directed at the area of cutting action, regardless of the extent of advance of any particular cut; it will be understood that such is not the case in conventional arrangements in which the coolant is supplied from nozzles held by the frame of the machine.

While I have described my invention for the preferred forms shown, it will be understood that modifications may be made within the scope of the invention as defined in the claims which follow.

I claim:

1. In a tool holder or the like, a main body portion having a fluid-communicating duct therein, connection means at the inlet end of said duct for connection of said duct to a source of fluid supply, tool-supporting means on said body portion and independent of said duct, and a stream-deflecting member carried by said body portion and including a part overstanding the other end of said duct, said deflecting member being inclined to direct fluid from said duct into the vicinity of cutting action of a tool carried by said tool-supporting means.

2. In a tool holder, a main body portion having a fluid-communicating duct therein, adjustable tool-supporting means on said body portion, one end of said duct opening to the outside of said body portion independently of said tool-supporting means, a stream-deflecting member including a part overstanding said end of said duct, and adjustable securing means for securing said member to said body portion for adjustably directing fluid from said duct toward the working portions of a tool adjustably held by said tool-supporting means.

3. In a tool holder, a body member having a fluid-communicating duct therein, tool-supporting means on said body member, said duct opening to the outside of said body portion near said tool-supporting means, and a cap member carried by said body member over said end of said duct and cooperating with said body member to define a nozzle-like opening which may be directed toward the working portions of a tool held by said tool-supporting means.

4. In a tool holder, a body member having a fluid communicating duct therein, tool-supporting means on said body member, a flat on said body member near said tool-supporting means, one end of said duct opening to said flat, and a cap member including a portion fitting over said end of the duct, said cap member having a concave inner surface facing said end of the duct and opening on a side of the cap member in the direction of a tool carried by said tool-supporting means.

5. In a tool holder, a body member having a fluid-communicating duct therein, supporting means for a tool having a cutting edge extending in substantially a single direction, said duct opening at one end to the outside of said body member near said supporting means, and a cap member over said end of the duct, said cap and body members cooperating to define a generally fan-shaped outlet orifice for said duct, the plane of the fan shape of said outlet substantially including the cutting edge of the tool.

6. In a tool holder, a body member having a fluid communicating duct therein, supporting means for a tool having a cutting edge, one end of said duct opening to the outside of said body member near said supporting means, said body member at said end of the duct being formed with a surface which if projected would include substantially the entire cutting edge of the tool, and a cap member over said end of the duct and including portions conforming to said surface of said body member, said cap member having a hollowed-out generally fan-shaped portion overstanding said end of the duct and opening toward the cutting edge of the tool, whereby said surface and said cap member may cooperate to direct a generally fan-shaped fluid spray directed at substantially the entire cutting edge of the tool.

7. In a tool holder, a body member having a fluid-communicating duct therein, one end of the duct opening to the outside of said body member, a flat on said body at said end of the duct, a cap member having a hollowed-out portion cooperating with said flat to define a nozzle for directing a stream of fluid in the vicinity of cutting action of a tool carried by said tool holder, and securing means for anchoring said cap member to said body member.

8. A tool holder according to claim 7, wherein said securing means includes a screw having an axis generally normal to said flat and passing through said cap on the side of said end of the duct away from the hollowed-out portion of said cap, whereby the nozzle formed by said flat and said cap may be adjustably directed from said body member.

9. In a tool holder, a body member having a fluid-communicating duct therein, nozzle means at one end of said duct, adapter means to cooperate slidably with the inlet end of the duct, said adapter means including an enlarged portion, and resilient means engaging said enlarged portion and said body member for holding said adapter in longitudinal abutment with said body member.

10. In a tool holder, a body member having a fluid-communicating duct therein, nozzle means at one end of said duct, a counterbore at the other end of said duct, adapter means including a portion slidably fitting in said counterbore and an enlarged circumferentially extending portion, and resilient latch means carried by said body member for engaging said enlarged portion to hold said adapter means in longitudinal abutment with said body member.

11. In a tool holder, a body member having a fluid-communicating duct therein, connection means at the inlet end of said duct for connection of said duct to a source of fluid supply, tool-supporting means on said body member, first nozzle means carried by said body member on one side of said tool-supporting means and communicating with said duct, and second nozzle means carried by said body member on another side of said tool-supporting means and in communication with said duct, whereby fluid sprays may be directed at a plurality of sides of a tool carried by said tool-supporting means.

12. In a tool holder, a body having a fluid-communicating duct with an outlet opening on the outside of said body, a cap member overstanding said outlet and cooperating with said body at said outlet to define a directional nozzle, and means for adjustably securing said cap member in various angular positions, whereby the direction of the nozzle may be adjustably secured.

WILLIAM B. RETZ.

REFERENCES CITED

The following references are of record in the file of this patent:

UNITED STATES PATENTS

| Number | Name | Date |
| --- | --- | --- |
| 160,161 | Clay | Feb. 23, 1875 |
| 302,292 | Soderstrom | July 22, 1884 |
| 591,120 | Sherman | Oct. 5, 1897 |
| 1,187,302 | Gorton | June 13, 1916 |
| 1,425,943 | Clarke | Aug. 15, 1922 |